United States Patent
Purang et al.

(10) Patent No.: US 7,840,568 B2
(45) Date of Patent: Nov. 23, 2010

(54) SORTING MEDIA OBJECTS BY SIMILARITY

(75) Inventors: Khemdut Purang, San Jose, CA (US); Mark Plutowski, Santa Cruz, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 255 days.

(21) Appl. No.: 11/435,494

(22) Filed: May 16, 2006

(65) Prior Publication Data

US 2007/0271296 A1  Nov. 22, 2007

(51) Int. Cl.
 *G06F 7/00* (2006.01)
(52) U.S. Cl. .................. 707/748; 707/751; 707/752; 707/737; 709/206
(58) Field of Classification Search .......... 707/748, 707/751, 752, 737; 709/200, 206
See application file for complete search history.

(56) References Cited

U.S. PATENT DOCUMENTS

| | | | |
|---|---|---|---|
| 5,566,291 A | 10/1996 | Boulton et al. | |
| 5,764,239 A | 6/1998 | Misue et al. | |
| 5,963,746 A | 10/1999 | Barker et al. | |
| 6,105,046 A | 8/2000 | Greenfield et al. | |
| 6,256,648 B1 | 7/2001 | Hill et al. | |
| 6,282,548 B1 | 8/2001 | Burner et al. | |
| 6,373,484 B1 | 4/2002 | Orell et al. | |
| 6,460,036 B1 * | 10/2002 | Herz | 707/748 |
| 6,473,851 B1 | 10/2002 | Plutowski | |
| 6,484,199 B2 | 11/2002 | Eyal | |
| 6,513,027 B1 | 1/2003 | Powers et al. | |
| 6,539,354 B1 | 3/2003 | Sutton et al. | |
| 6,545,209 B1 | 4/2003 | Flannery et al. | |
| 6,592,627 B1 | 7/2003 | Agrawal et al. | |
| 6,625,585 B1 | 9/2003 | MacCuish et al. | |
| 6,668,273 B1 | 12/2003 | Rust | |
| 6,714,897 B2 | 3/2004 | Whitney et al. | |
| 6,732,145 B1 | 5/2004 | Aravamudan et al. | |
| 6,748,418 B1 | 6/2004 | Yoshida et al. | |
| 6,785,688 B2 | 8/2004 | Abajian et al. | |
| 6,801,229 B1 | 10/2004 | Tinkler | |
| 6,941,300 B2 | 9/2005 | Jensen-Grey | |
| 6,996,575 B2 | 2/2006 | Cox et al. | |
| 7,085,736 B2 | 8/2006 | Keezer et al. | |
| 7,162,691 B1 | 1/2007 | Chatterjee et al. | |
| 7,165,069 B1 | 1/2007 | Kahle et al. | |
| 7,184,968 B2 * | 2/2007 | Shapiro et al. | 705/10 |
| 7,185,001 B1 | 2/2007 | Burdick et al. | |

(Continued)

OTHER PUBLICATIONS

Pavel Moravec, Michal Kolovrat, and Vaclav Snasel, "LSI vs. Wordnet Ontology in Dimension Reduction for Information Retrieval", 2004, pp. 18-26, ISBN 80-248-0457-3.

(Continued)

*Primary Examiner*—Don Wong
*Assistant Examiner*—Tuan-Khanh Phan
(74) *Attorney, Agent, or Firm*—Blakely, Sokoloff, Taylor & Zafman LLP

(57) ABSTRACT

Weights are assigned for attributes of multimedia objects by sorting the attributes into preference levels, and computing a weight for each preference level. A similarity value of a multimedia object to an object of interest is computed based on the attribute weights.

16 Claims, 8 Drawing Sheets

U.S. PATENT DOCUMENTS

| | | | |
|---|---|---|---|
| 7,203,698 | B2 | 4/2007 | Yamashita |
| 7,216,129 | B2 | 5/2007 | Aono et al. |
| 7,330,850 | B1 | 2/2008 | Seibel et al. |
| 7,340,455 | B2 | 3/2008 | Platt et al. |
| 7,371,736 | B2 | 5/2008 | Shaughnessy et al. |
| 7,392,248 | B2 | 6/2008 | Bakalash et al. |
| 2001/0045952 | A1 | 11/2001 | Tenev et al. |
| 2002/0035603 | A1 | 3/2002 | Lee et al. |
| 2002/0099696 | A1 | 7/2002 | Prince |
| 2002/0099731 | A1 | 7/2002 | Abajian |
| 2002/0099737 | A1 | 7/2002 | Porter et al. |
| 2002/0107827 | A1 | 8/2002 | Benitez-Jimenez et al. |
| 2002/0138624 | A1 | 9/2002 | Esenther |
| 2003/0011601 | A1 | 1/2003 | Itoh et al. |
| 2003/0033318 | A1 | 2/2003 | Carlbom et al. |
| 2003/0041095 | A1 | 2/2003 | Konda et al. |
| 2003/0041108 | A1 | 2/2003 | Henrick et al. |
| 2003/0084054 | A1 | 5/2003 | Clewis et al. |
| 2003/0089218 | A1 | 5/2003 | Gang et al. |
| 2003/0105819 | A1 | 6/2003 | Kim et al. |
| 2003/0217335 | A1 | 11/2003 | Chung et al. |
| 2004/0083236 | A1 | 4/2004 | Rust |
| 2004/0090439 | A1 | 5/2004 | Dillner |
| 2004/0117367 | A1 | 6/2004 | Smith et al. |
| 2004/0133555 | A1 | 7/2004 | Toong et al. |
| 2004/0133639 | A1 | 7/2004 | Shuang et al. |
| 2004/0193587 | A1 | 9/2004 | Yamashita |
| 2004/0215626 | A1 * | 10/2004 | Colossi et al. .............. 707/100 |
| 2004/0260710 | A1 | 12/2004 | Marston et al. |
| 2005/0027687 | A1 | 2/2005 | Nowitz et al. |
| 2005/0033807 | A1 | 2/2005 | Lowrance et al. |
| 2005/0060350 | A1 | 3/2005 | Baum et al. |
| 2005/0114324 | A1 | 5/2005 | Mayer |
| 2005/0289109 | A1 | 12/2005 | Arrouye et al. |
| 2005/0289168 | A1 | 12/2005 | Green et al. |
| 2006/0023724 | A1 | 2/2006 | Na et al. |
| 2006/0025175 | A1 | 2/2006 | Lapstun et al. |
| 2006/0112141 | A1 | 5/2006 | Morris |
| 2006/0122819 | A1 | 6/2006 | Carmel et al. |
| 2006/0167942 | A1 * | 7/2006 | Lucas et al. .............. 707/104.1 |
| 2006/0218153 | A1 | 9/2006 | Voon et al. |
| 2007/0005581 | A1 | 1/2007 | Arrouye et al. |
| 2007/0130194 | A1 | 6/2007 | Kaiser |
| 2007/0192300 | A1 | 8/2007 | Reuther et al. |
| 2007/0233730 | A1 * | 10/2007 | Johnston .................. 707/104.1 |
| 2007/0245373 | A1 | 10/2007 | Shivaji-Rao et al. |
| 2008/0133466 | A1 | 6/2008 | Smith et al. |
| 2008/0313214 | A1 | 12/2008 | Duhig et al. |

OTHER PUBLICATIONS

Ana B. Benitez, John R. Smith, Shih-Fu Chang, "MediaNet: A Multimedia Information Network for Knowledge Representation", in Proc., SPIE, 2001.

Lawrence Reeve and Hyoil Han, "Semantic Annotation for Semantic Social Networks", Using Community Resources, AIS SIGSEMIS Bulletin, vol. 2, Issue (3&4), 2005, pp. 52-56.

Maria Ruiz-Casado, Enrique Alfonseca and Pablo Castells, "Automatic Extraction of Semantic Relationships for WordNet by Means of Pattern Learning From Wikipedia", Castells in Lecture Notes in Computer Science, vol. 3513, 2005.

George A. Miller, Richard Beckwith Christiane Fellbaum, "Introduction to WordNet: An On-Line Lexical Database", Int. J. Lexicography, 1990, vol. 3, pp. 235-244.

Sebastian, F., "Machine Learning in Automated Text Categorization", Mar. 2002, ACM, vol. 34, Issue 1, pp. 1-47.

Chen, et al., "Predicting Category Accesses for a User in a Structured Information Space", Aug. 2002, ACM, pp. 65-72.

* cited by examiner

SORTING MEDIA OBJECTS BY SIMILARITY

This patent application is related to the U.S. Patent Applications, entitled "CLUSTERING AND CLASSIFICATION OF CATEGORY DATA", Ser. No. 11/436,142, now U.S. Pat. No. 7,774,288, issued Aug. 10, 2010, assigned to the same assignee as the present application.

TECHNICAL FIELD

This invention relates generally to multimedia, and more particularly sorting multimedia objects by similarity.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2005, Sony Electronics, Incorporated, All Rights Reserved.

BACKGROUND

Clustering and classification tend to be important operations in certain data mining applications. For instance, data within a dataset may need to be clustered and/or classified in a data system with a purpose of assisting a user in searching and automatically organizing content, such as recorded television programs, electronic program guide entries, and other types of multimedia content.

Generally, many clustering and classification algorithms work well when the dataset is numerical (i.e., when data within the dataset are all related by some inherent similarity metric or natural order). Categorical datasets describe multiple attributes or categories that are often discrete, and therefore, lack a natural distance or proximity measure between them.

It may be desirable to display a set of multimedia objects that a user may be interested in given a multimedia object that the user has shown interest in.

SUMMARY

Weights are assigned for attributes of multimedia objects by sorting the attributes into preference levels, and computing a weight for each preference level. A similarity value of a multimedia object to an object of interest is computed based on the attribute weights.

The present invention is described in conjunction with systems, clients, servers, methods, and machine-readable media of varying scope. In addition to the aspects of the present invention described in this summary, further aspects of the invention will become apparent by reference to the drawings and by reading the detailed description that follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1A:
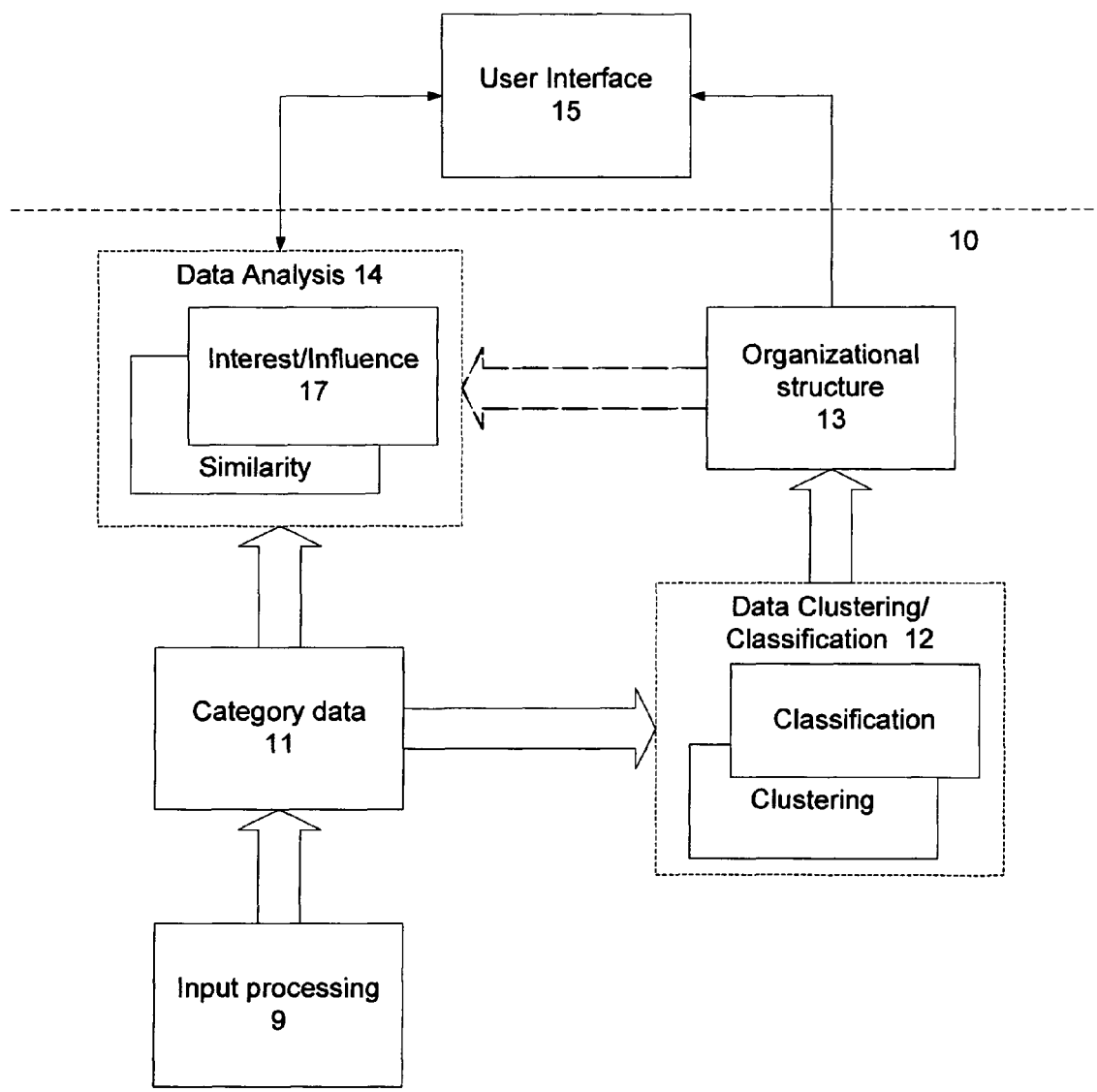
FIG. 1A illustrates one embodiment of a multimedia database system.

FIG. 1A is a diagram of a data system 10 that enables automatic recommendation or selection of information, such as content, which can be characterized by category data 11. Category data describes multiple attributes or categories. Often the categories are discrete and lack a natural similarity measure between them. Thus, category databases could be sparse because of the discreteness of the categories. Examples of category data include electronic program guide (EPG) data, and content metadata.

A user interface 15 also shown in FIG. 1A is designed to assist the user in searching and automatically organizing content using the data system 10. Such content may be, for example, recorded TV programs, electronic program guide (EPG) entries, and multimedia content.

The category data 11 is grouped into clusters, and/or classified into folders by the clustering/classification module 12. Details of the clustering and classification performed by module 12 are below. The output of the clustering/classification module 12 is an organizational data structure 13, such as a cluster tree or a dendrogram. A cluster tree may be used as an indexed organization of the category data or to select a suitable cluster of the data.

Many clustering applications require identification of a specific layer within a cluster tree that best describes the underlying distribution of patterns within the category data. In one embodiment, organizational data structure 13 includes an optimal layer that contains a unique cluster group containing an optimal number of clusters.

A data analysis module 14 may use the folder-based classifiers and/or classifiers generated by clustering operations for automatic recommendation or selection of content. The data analysis module 14 may automatically recommend or provide content that may be of interest to a user or may be similar or related to content selected by a user. In one embodiment, a user identifies multiple folders of category data records that categorize specific content items, and the data analysis module 14 assigns category data records for new content items with the appropriate folders based on similarity.

In another embodiment, data analysis module 14 comprises interest/influence module 17 that orders the artists associated with the category data by artist influence. Data analysis module 14 comprises similarity module 18 that sorts media objects by similarity. Sorting multimedia objects by similarity is further described in FIGS. 2-5 below.

Clustering is a process of organizing category data into a plurality of clusters according to some similarity measure among the category data. The module 12 clusters the category data by using one or more clustering processes, including seed based hierarchical clustering, order-invariant clustering, and subspace bounded recursive clustering. In one embodiment, the clustering/classification module 12 merges clusters in a manner independent of the order in which the category data is received.

In one embodiment, the group of folders created by the user may act as a classifier such that new category data records are compared against the user-created group of folders and automatically sorted into the most appropriate folder. In another embodiment, the clustering/classification module 12 implements a folder-based classifier based on user feedback. The folder-based classifier automatically creates a collection of folders, and automatically adds and deletes folders to or from the collection. The folder-based classifier may also automatically modify the contents of other folders not in the collection.

In one embodiment, the clustering/classification module 12 may augment the category data prior to or during clustering or classification. One method for augmentation is by imputing attributes of the category data. The augmentation may reduce any scarceness of category data while increasing the overall quality of the category data to aid the clustering and classification processes.

Although shown in FIG. 1A as specific separate modules, the clustering/classification module 12, organizational data structure 13, and the data analysis module 14 may be implemented as different separate modules or may be combined into one or more modules.

A filtering system is provided that presents the user with media objects of potential interest. The user provides active and/or passive feedback to the system relating to some presented objects. The feedback is used to find media objects that are similar to the media objects viewed by the user.

Figure 1B:
FIG. 1B illustrates one embodiment of program metadata.

FIG. 1B illustrates one embodiment of program metadata 150. Program metadata 150 is information that describes content used by data system 10. In FIG. 1B, program metadata comprises program identifier 152, station broadcaster 154, broadcast region 156, category data 158, genre 160, date 162, start time 164, end time 166, duration 168, and artists 170. Program identifier 152 identifies the content used by data system 10. Station broadcaster 154 and broadcast region 156 identify the broadcaster and the region where content was displayed. In addition, program metadata 150 identifies the date and time the content was displayed with date 162, start time 164, end time 166. Duration 168 is the duration of the content. Furthermore, genre 160 describes the genre associated with the content.

Category data describes the different categories associated with the content. For example, category data 158 comprises terms: Best, Underway, Sports, GolfCategory, Golf, Art, 0SubCulture, Animation, Family, FamilyGeneration, Child, Kids, Family, FamilyGeneration, and Child. As illustrated, category data 158 comprises fifteen terms describing the program. Some of the terms are related, for example, "Sports, GolfCategory, Golf" are related to sports, and "Family, FamilyGeneration, Child, Kids", are related to family. Furthermore, category data 158 includes duplicate terms and possibly undefined terms (0SubCulture). Undefined terms may be only associated with one program, because the definition is unknown and, therefore, not very useful.

Figure 2:
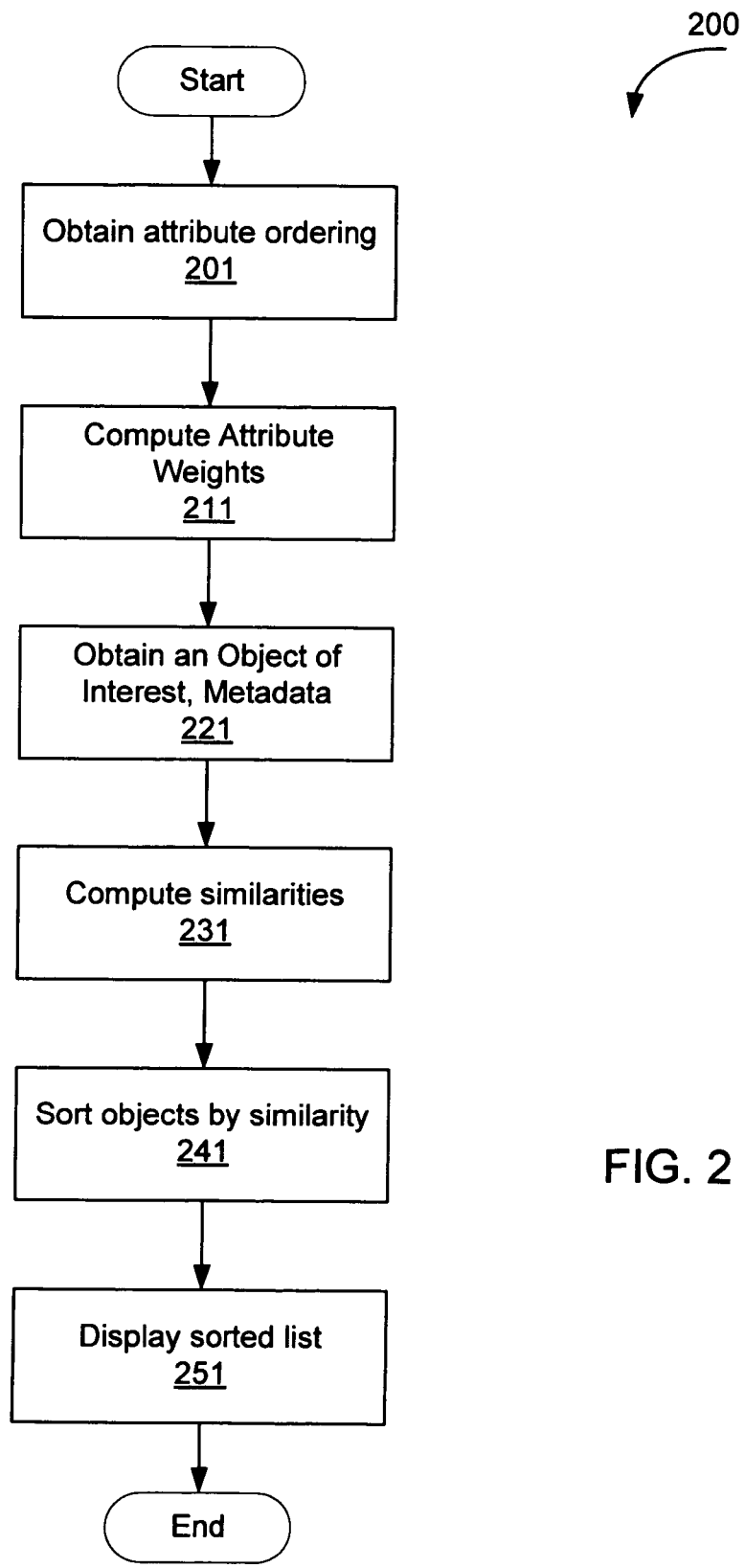
FIG. 2 is a flow chart of one embodiment of an overall method for sorting objects by similarity.

One embodiment of a method 200 to be performed by the data analysis module 14 to sort multimedia objects by similarity is described with reference to a flowchart shown in FIG. 2.

At block 201, an ordering of attributes is obtained. This ordering may be obtained in a number of ways. In one embodiment, the ordering is obtained by the data analysis module 10 from a user profile created by the user. In another embodiment, the ordering is obtained by the data analysis module 10 when a user enters search criterion. In another embodiment, the ordering is obtained by the data analysis module 10 by learning the user preferences. Accordingly, two attributes that are equally important to a user belong to a particular preference level, and preference levels can have a value starting from zero. The preference level value of zero indicates that the user does not consider the attribute(s) in that level to be at all important.

At block 211, attribute weights are computed. One embodiment of a method 300 to be performed to compute attribute weights is described with reference to a flowchart shown in FIG. 3. The attribute weights may reflect a rank of ordering of user preferences or a relative importance of the attributes (e.g., an attribute may be twice as important as another).

At block 221, a user input of a chosen object is received. Other inputs, such as object metadata, and object to rank may also be received. For instance, the metadata related to a song may be artist name, genre, name of producer, song writer name, and so on. The metadata is categorical in nature, and may be obtained from one or more sources, such as American Media Communications.

At block 231, similarities between the chosen object and other objects to be ranked are calculated. One embodiment of a method 400 to be performed to compute similarities is described with reference to a flowchart shown in FIG. 4.

At block 241, the objects are sorted based on a measure of their similarity to the object of interest to the user, and at block 261, a sorted list is displayed to the user.

One embodiment of a method 300 to be performed to compute attribute weights is described with reference to a flowchart shown in FIG. 3.

Method 300 receives as inputs the user attribute ordering (e.g., from block 201) and certain data statistics. The data statistics, may include, the maximum number of values that each attribute can have. For example, the attribute "directors" of a movie may have value of more than 1, but a maximum of 5.

At block 311, the user attribute ordering is used to sort the attributes and a "current_weight" value that is not yet assigned to any attribute is set to 1.

The method 300 computes attribute weights for the preference levels greater than zero. One way of computing attribute weights is to loop over all preference levels greater than zero. At block 321, for a first preference level greater than zero, the level_weight is set to "current_weight+1" at block 331. Thus, when the loop over the preference levels starts, the level_weight is equal to two since current_weight was set to one at block 311.

At block 351, the "attribute_weight" for an attribute is set to the level_weight, and current_weight is incremented by the value of level_weight multiplied by the maximum number of values in the attribute. The loop continues for more attributes at the same preference level.

If there are no more attributes at the same preference level, the loop goes back to decision block 321, where if there are more preference levels greater than zero, the loops start again. At block 361, the attribute weights have been calculated and are returned.

Figure 3:
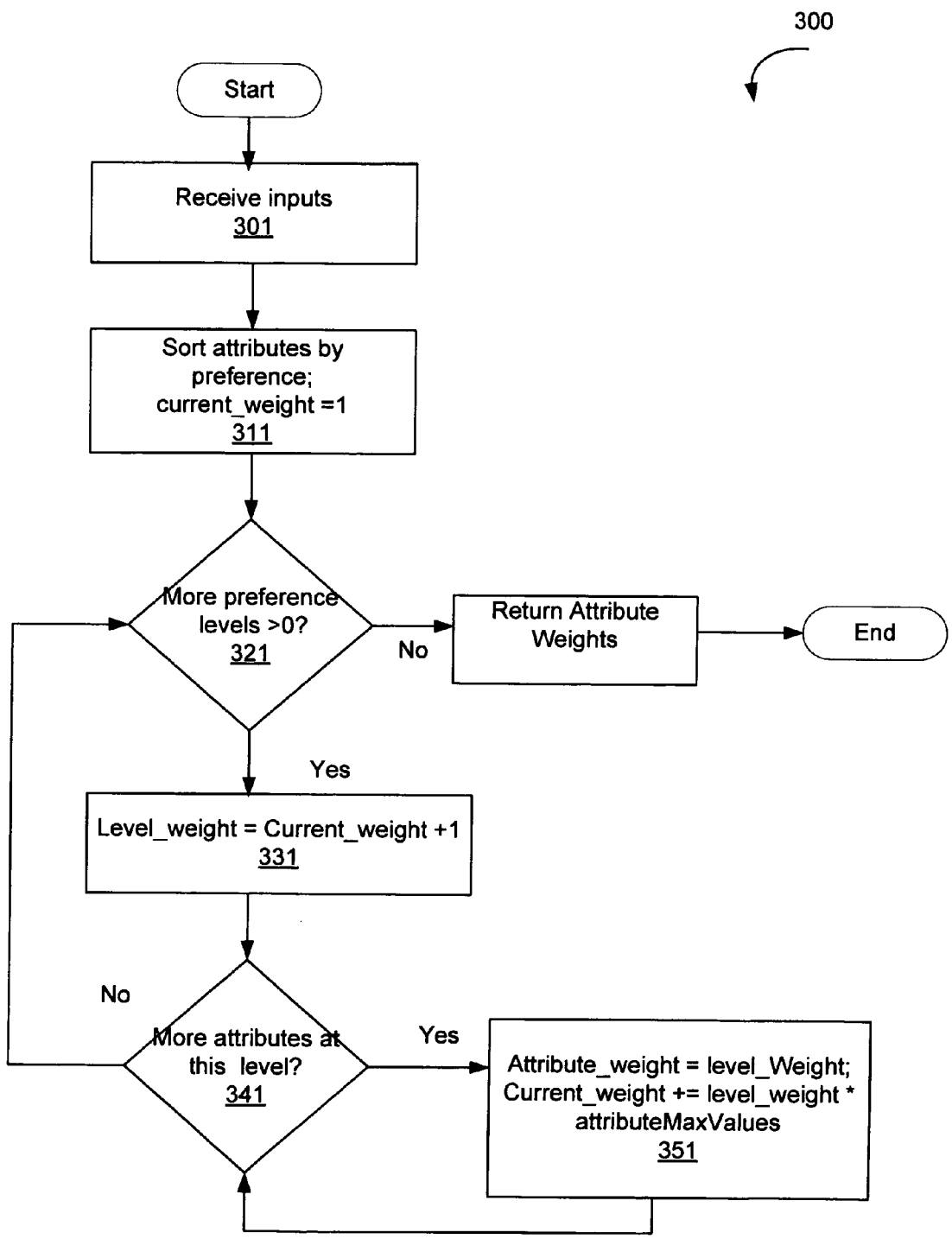
FIG. 3 is a flow chart of one embodiment of a method for computing attribute weights.

Thus, in the embodiment shown in FIG. 3, the method 300 starts with current_weight=1 for the lowest ranked attributes, and that is the level_weight for that level, so all the attributes in that level get a weight of 1. As the attribute weights for this level are being computed, the current_weight is being incremented, but it is not used for that level. Instead, at the next level, the level_weight is the now much larger current_weight so that all attributes at this level will be stronger than the previous ones. The process continues until there are no levels left.

Further, the current_weight depends on the maximum number of values for the attribute which was last looked at. Thus, depending on which attribute within the previous level was used last, the level_weight will vary. Accordingly, no matter how the attributes at the lower level match, they should not be stronger than the next higher level. So, the weight of the current level has to depend on the previous (lower) level, and should be high enough for the current level to win over the lower ones. Thus, e.g., for two levels A and B where A is lower than B, there are three objects O1, O2, O3. And say O1 and O2 match 100% with attributes in level A and 0% on attributes in B, but O1 and O3 match 0% with A, but there is just one match on B, which could be 0.0001%. The weights computed are such that when multiply with the number of matches to find the similarities, O3 ends up being more similar to O1 than O2 is.

An example computation of attribute weights is now described. Say, e.g., that the method 300 receives the following information: User "U" rates attribute "A" as very important, attribute "B" as very important, attribute "C" as not important, and attribute "D" as important. Of course, other ways of rating attributes may also be used. Attribute A has 10 value maximum, attribute B has 5 value maximum, attribute C has 10 value maximum, and attribute D has a 2 value maximum.

As an example, attributes for a "song" may include "song writer name(s)", "performer name(s)", year of production, genre, name of album and so on. Each attribute may have one or more values. For e.g., the attribute "song writer name(s)" for the song "Birthday" may have two values—Paul McCartney and John Lennon. The attribute "performer name(s)" for that song may have just one value—the Beatles. The year of production for this song has one value—1968. The name of album for this song has one value—The White Album.

The method 300 sorts the attributes by preferences. Accordingly, the method 300 may assign a preference level of "0" to attribute "C", a preference level of "1" to attribute "D", and a preference level of "2" to attributes A and B. Also, current_weight is set to 1. Level_weight for level 1 is set to 2. For attribute D, attribute_weight is set to 2 (the value of level_weight). The value of current_weight is equal to 1 plus 4 (the value of level_weight multiplied by 2). Thus, current_weight is equal to 5.

Because there are no more attributes at this level, and there are more preference levels greater than zero (preference level 2), level_weight is set to 6 (current_weight+1). Because there are more attributes at this level (attribute A), attribute_weight of A is set to 6 (level_weight). The value of current_weight is equal to 1 plus 60 (the value of level_weight multiplied by 10). Thus, current_weight is equal to 61.

Because there are more attributes at this level (attribute B), attribute_weight of B is set to 6 (level_weight). The value of current_weight is equal to 1 plus 30 (the value of level_weight multiplied by 5). Thus, current_weight is equal to 31.

Because there are no more attributes and no more preference levels, the following attribute weights are returned to method 200: attribute A weight=61, attribute B weight=31, and attribute D weight=5.

Figure 4:
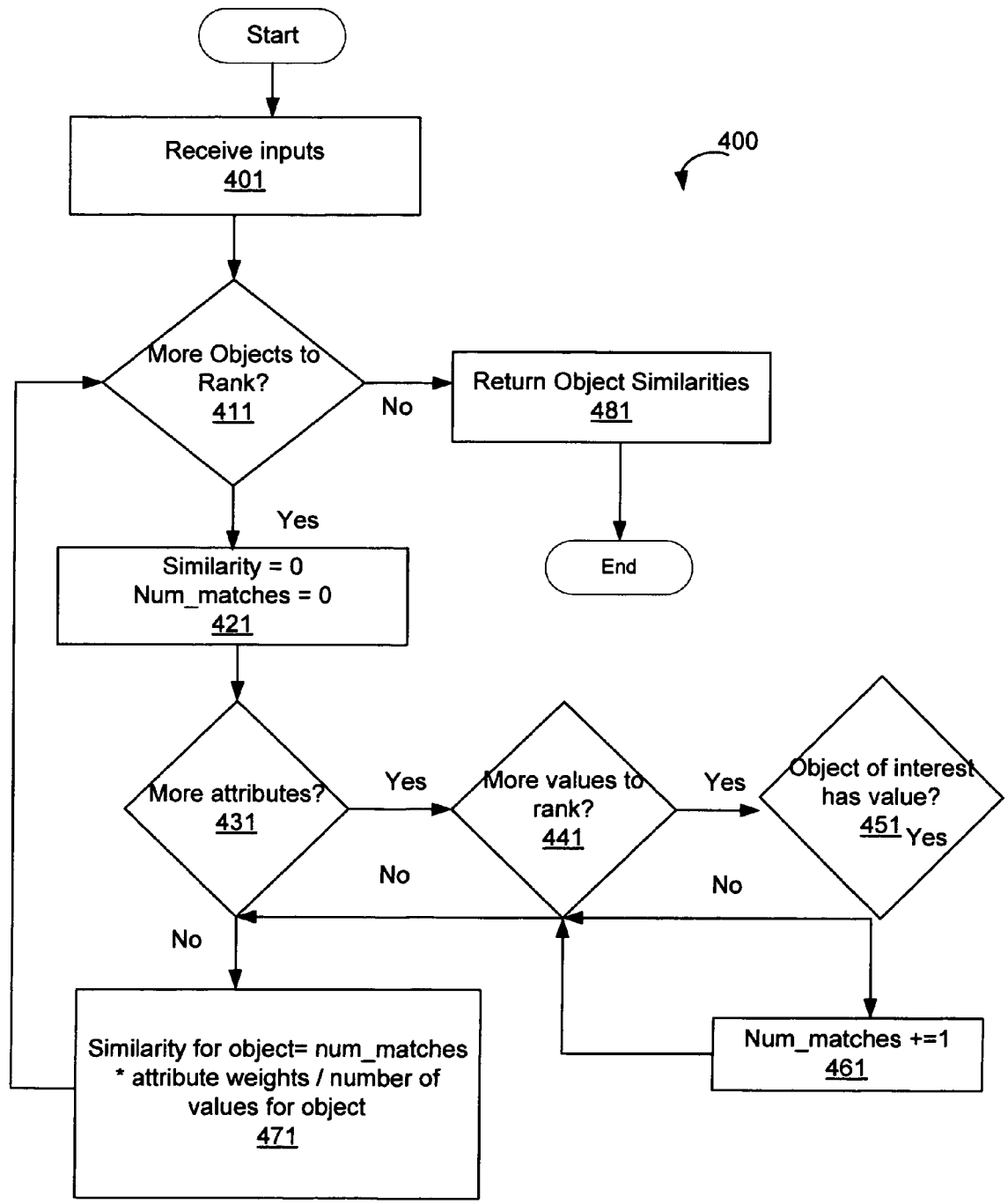
FIG. 4 is a flow chart of one embodiment of a method to compute similarities.

One embodiment of a method 400 to be performed to compute similarities between an object of interest and objects to be ranked is described with reference to a flowchart shown in FIG. 4.

At block 401, the method 400 receives the following inputs: objects to rank, object metadata, attribute weights, and object of interest. The objects to rank may include all or some objects from a collection of objects. In one embodiment, the objects to rank may be received by filtering objects from the collection of objects based on one or more criterion, including, e.g., a user query. The object metadata may be read in, as described with respect to block 201 of FIG. 2. The attribute weights may be obtained at block 231 of FIG. 2. The object of interest may be obtained at block 241 of FIG. 2.

At block 411, as long as there are objects to rank, the process continues to block 421, where for an object, a similarity value is set to zero and a value for "num_matches" is set to zero. The values "num_matches" represents number of matches between the values of attributes of an object to rank and the object of interest. At blocks 431 and 441, for each attribute of the object, and for each value in the L attribute, it is determined whether the object of interest has the same value at block 451. If the object of interest is determined to have the same value as the value of the attribute of the object to be ranked, then at block 461, the value of num_matches is incremented by one. The flow returns to block 441, when the object of interest does not have the same value or after the value of num_matches has been incremented.

At block 441, the flow continues to block 451 if the attribute of the object to be ranked as more values. Otherwise, the flow returns to block 431, where if the object to be ranked as more attributes, the flow continues to block 441. Otherwise, if all the attributes of the object to be ranked have been exhausted, at block 471, the value of the term similarity for each object to be ranked is equal to num_matches of the values within the attributes of the object multiplied by attribute weight and divided by number of values for the object. Accordingly, this measure of similarity between an object of the plurality of objects and the object of interest is calculated based on a number of matches between values of attributes of the two objects.

Accordingly, the number of matches an object to be ranked has with the object of interest is normalized over a total number of values in the object. Other normalizing factors may also be used. For example, the value of similarity may be normalized for each individual value of each object.

An example to compute similarities between an object of interest and objects to be ranked is now described.

Say, e.g., that method 300 receives the following inputs: objects P and Q to rank, object metadata, attribute weights (attribute A weight=4, attribute B weight=4, and attribute D weight=2), and object R of interest. The objects P, Q and R may be, e.g., movies, and attributes A, B and D, may respectively be female actors, male actors and directors. For object P, attribute A has 2 values, attribute B has 2 values, and attribute D has 1 value. For object Q, attribute A has 2 values, attribute B has 4 values, and attribute D has 6 values.

For object P, a similarity value is set to zero and a value for "num_matches" is set to zero. The values "num_matches" represents number of matches between the values of attributes of an object to rank and the object of interest. For attribute A of object P, and for each of the two values in the attribute A, it is determined whether the object of interest has the same value. If the object of interest is determined to have the same value as the value of the attribute of the object to be ranked, then the value of num_matches is incremented by one. Here, suppose one of the values of attribute A of object P matches with one of the values of object R (e.g., both movies have Julia Roberts as one of female actresses). Therefore, num_matches=1.

For attribute B of object P, it is determined that none of the two values for attribute B match with the values of attributes of object R. The value of num_matches is not incremented.

For attribute D of object P, it is determined that the value for attribute D matches with a value of attributes of object R and the value of num_matches is incremented. Since there are no more attributes for object P, the value of object's P similarity to object R is calculated as number of matches (2) multiplied by attribute weights (61+31+5) divided by number of values in object P (5), and thus equals 38.8.

The procedure continues for object Q. Here, assuming that 1 value of the attribute A, 1 value of the attribute B, and 2 values of the attribute D of object Q match with values of object R, object's Q similarity to object R is calculated as number of matches (4) multiplied by attribute weights (61+31+5) divided by number of values in object P (12), and thus equals 32.33. The normalization helps to assure that an object having a large number of values, and thus having a higher probability of matching values with the object of interest, is penalized.

Otherwise, if all the attributes of the object to be ranked have been exhausted, the value of the term similarity for the object to be ranked is equal to num_matches multiplied by the sum of attribute weights for the object and divided by sum of number of values for each object.

Figure 5:
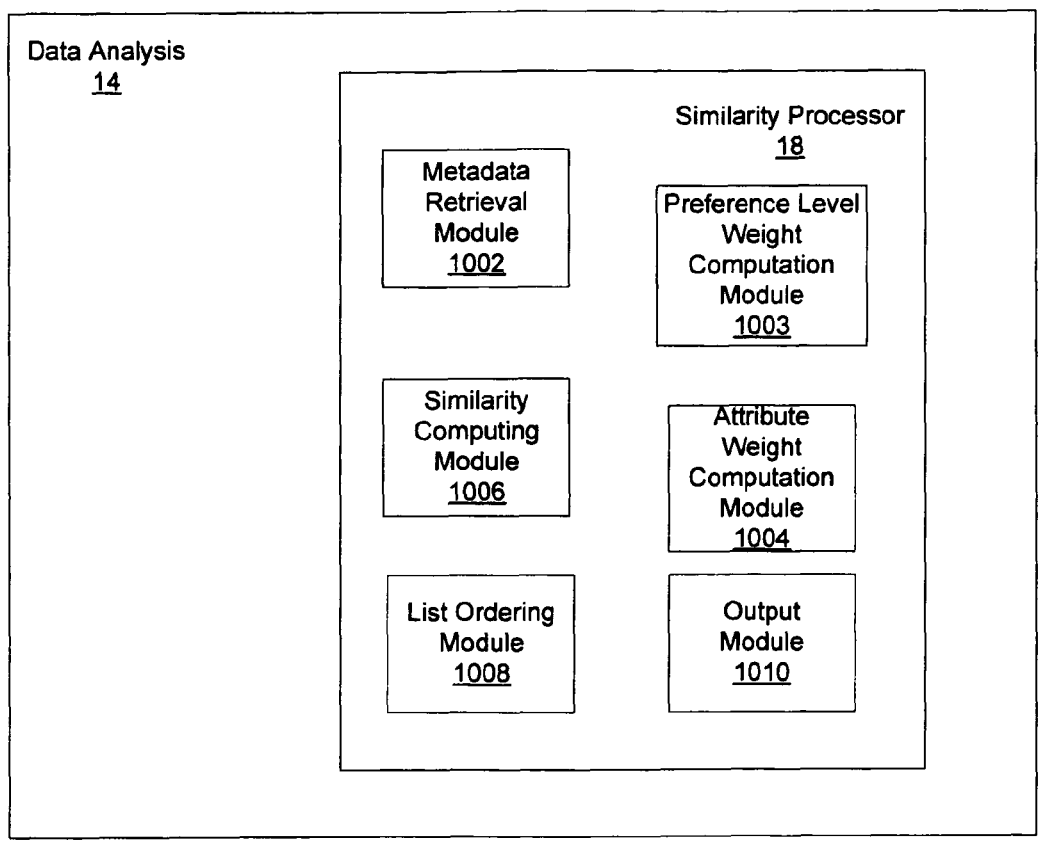
FIG. 5 is a block diagram illustrating one embodiment of a device that sorts media objects by similarity.

FIG. 5 is a block diagram illustrating one embodiment of a device that sorts media objects by similarity. In one embodiment, data analysis module 14 contains interest/influence module 17. Alternatively, data analysis module 14 does not contain interest/influence module 17, but is coupled to interest/influence module 17. Interest/influence module 17 comprises metadata retrieval module 1002, preference level weight computation module 1003, attribute weight computation module 1004, similarity computing module 1006, list ordering module 1008, and output module 1010. Metadata retrieval module 1002 retrieves metadata from the category data 10. Preference level weight computation module 1003 computes preference level weights as described with reference to FIG. 3. Attribute weight computation module 1004 computes attribute weights as described with reference to FIG. 3. Similarity computing module 1006 computes similarity of objects with an object of interest as described in with reference to FIG. 4. List ordering module 1008 sorts the list of objects based on a measure of similarity to the object of interest. An output module 1010 outputs the sorted list.

In practice, the methods described herein may constitute one or more programs made up of machine-executable instructions. Describing the method with reference to the flowchart in FIGS. 3-4 enables one skilled in the art to develop such programs, including such instructions to carry out the operations (acts) represented by logical blocks on suitably configured machines (the processor of the machine executing the instructions from machine-readable media). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that more or fewer processes may be incorporated into the methods illustrated in the flow diagrams without departing from the scope of the invention and that no particular order is implied by the arrangement of blocks shown and described herein.

Figure 6:
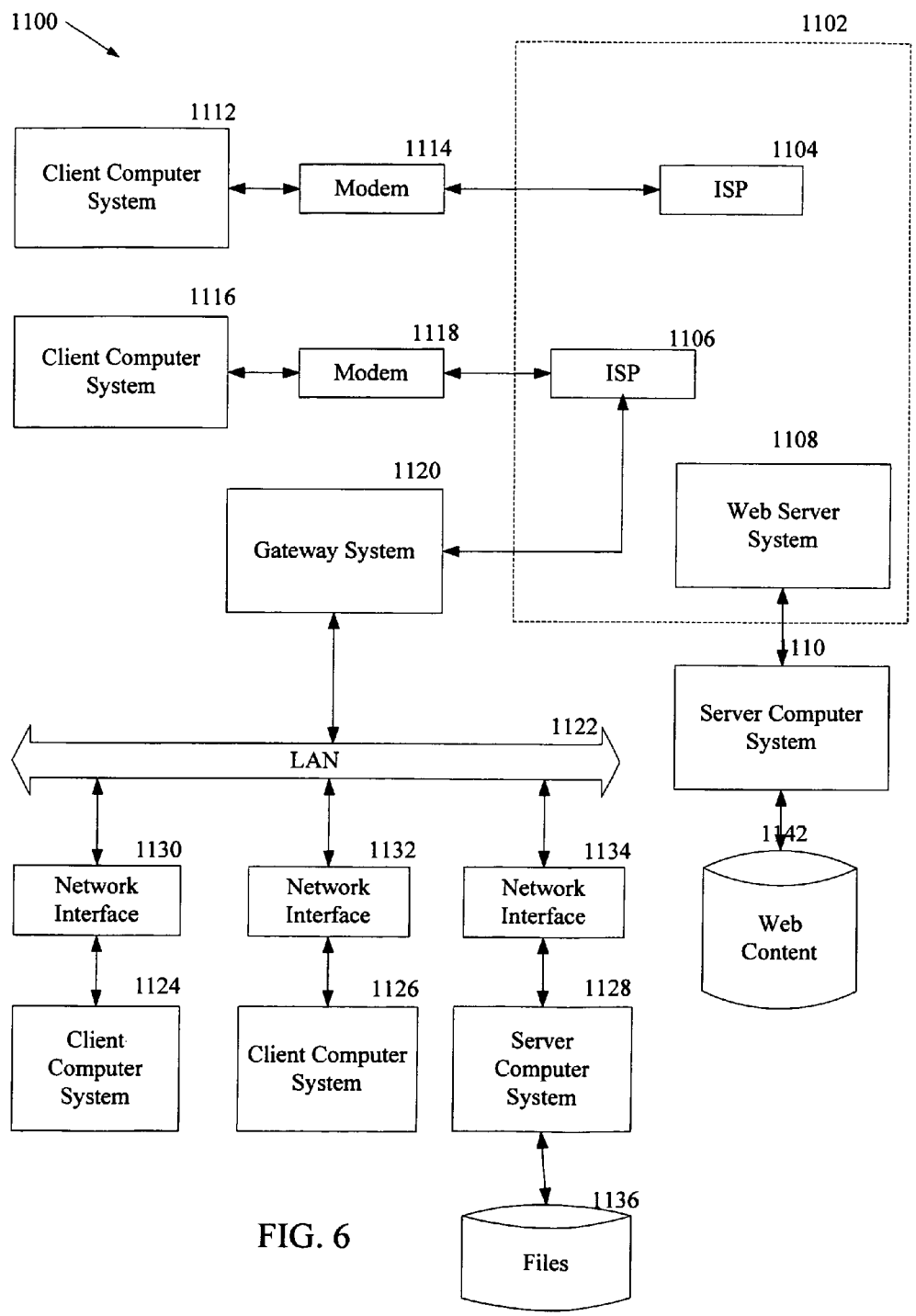
FIG. 6 is a diagram of one embodiment of an operating environment suitable for practicing the present invention.

FIG. 6 shows several computer systems 1100 that are coupled together through a network 1102, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 1102 is typically provided by Internet service providers (ISP), such as the ISPs 1104 and 1106. Users on client systems, such as client computer systems 1112, 1116, 1124, and 1126 obtain access to the Internet through the Internet service providers, such as ISPs 1104 and 1106. Access to the Internet allows users of the client computer systems to exchange information, receive and send e-mails, and view documents, such as documents which have been prepared in the HTML format. These documents are often provided by web servers, such as web server 1108 which is considered to be "on" the Internet. Often these web servers are provided by the ISPs, such as ISP 1104, although a computer system can be set up and connected to the Internet without that system being also an ISP as is well known in the art.

The web server 1108 is typically at least one computer system which operates as a server computer system and is configured to operate with the protocols of the World Wide Web and is coupled to the Internet. Optionally, the web server 1108 can be part of an ISP which provides access to the Internet for client systems. The web server 1108 is shown coupled to the server computer system 1110 which itself is coupled to web content 842, which can be considered a form of a media database. It will be appreciated that while two computer systems 1108 and 1110 are shown in FIG. 11, the web server system 1108 and the server computer system 1110 can be one computer system having different software components providing the web server functionality and the server functionality provided by the server computer system 1110 which will be described further below.

Client computer systems 1112, 1116, 1124, and 1126 can each, with the appropriate web browsing software, view HTML pages provided by the web server 1108. The ISP 1104 provides Internet connectivity to the client computer system 1112 through the modem interface 1114 which can be considered part of the client computer system 1112. The client computer system can be a personal computer system, a network computer, a Web TV system, a handheld device, or other such computer system. Similarly, the ISP 1106 provides Internet connectivity for client systems 1116, 1124, and 1126, although as shown in FIG. 11, the connections are not the same for these three computer systems. Client computer system 1116 is coupled through a modem interface 1118 while client computer systems 1124 and 1126 are part of a LAN. While FIG. 11 shows the interfaces 1114 and 1118 as generically as a "modem," it will be appreciated that each of these interfaces can be an analog modem, ISDN modem, cable modem, satellite transmission interface, or other interfaces for coupling a computer system to other computer systems. Client computer systems 1124 and 1116 are coupled to a LAN 1122 through network interfaces 1130 and 1132, which can be Ethernet network or other network interfaces. The LAN 1122 is also coupled to a gateway computer system 1120 which can provide firewall and other Internet related services for the local area network. This gateway computer system 1120 is coupled to the ISP 1106 to provide Internet connectivity to the client computer systems 1124 and 1126. The gateway computer system 1120 can be a conventional server computer system. Also, the web server system 1108 can be a conventional server computer system.

Alternatively, as well-known, a server computer system 1128 can be directly coupled to the LAN 1122 through a network interface 1134 to provide files 1136 and other services to the clients 1124, 1126, without the need to connect to the Internet through the gateway system 1120. Furthermore, any combination of client systems 1112, 1116, 1124, 1126 may be connected together in a peer-to-peer network using LAN 1122, Internet 1102 or a combination as a communications medium. Generally, a peer-to-peer network distributes data across a network of multiple machines for storage and retrieval without the use of a central server or servers. Thus, each peer network node may incorporate the functions of both the client and the server described above.

Figure 7:
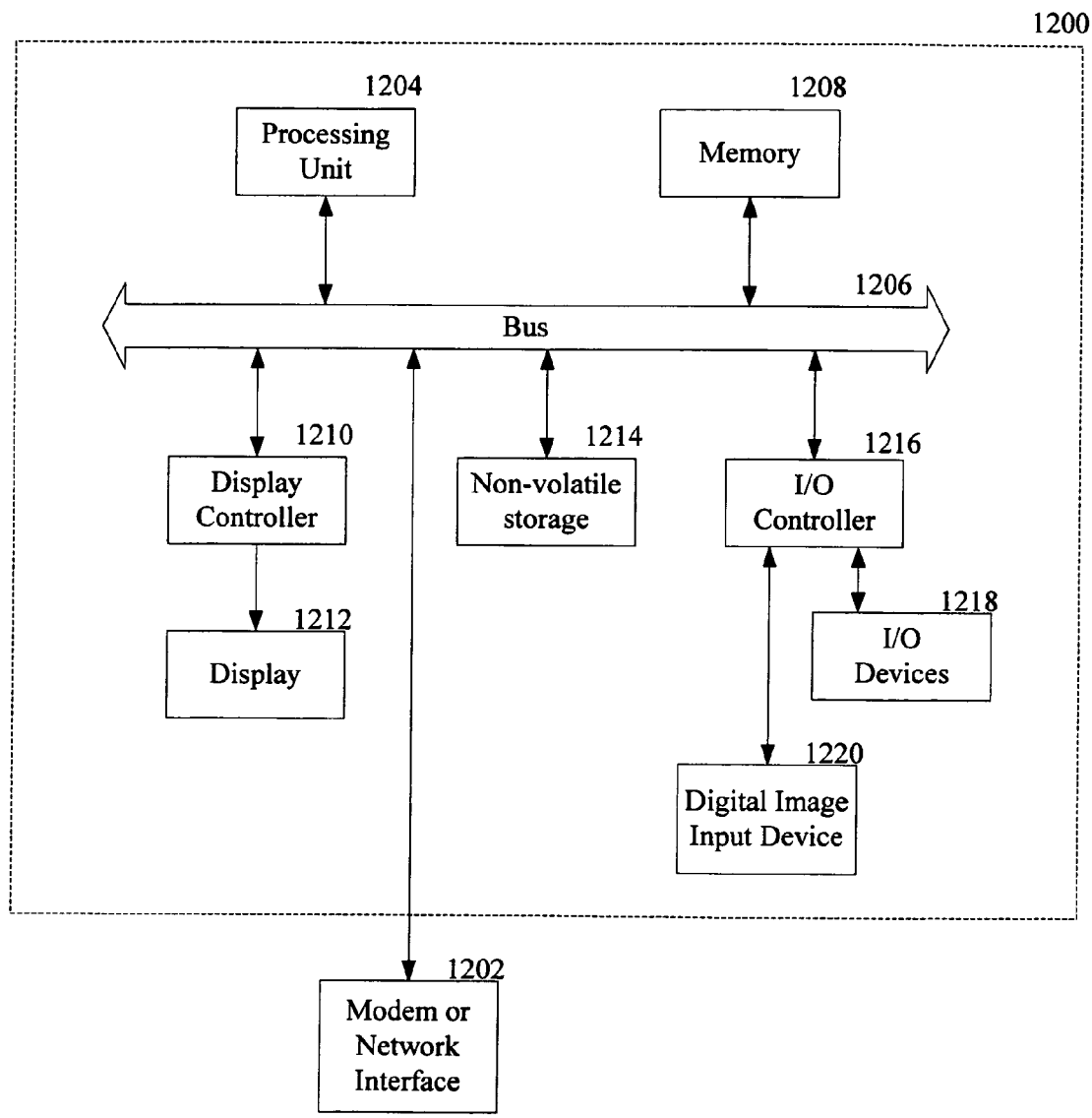
FIG. 7 a diagram of one embodiment of a computer system suitable for use in the operating environment of FIGS. 2-5.

The following description of FIGS. 6 and 7 is intended to provide an overview of computer hardware and other operating components suitable for performing the methods of the invention described above, but is not intended to limit the applicable environments. One of skill in the art will immediately appreciate that the embodiments of the invention can be practiced with other computer system configurations, including set-top boxes, hand-held devices, multiprocessor systems, microprocessor-based or programmable consumer electronics, network PCs, minicomputers, mainframe computers, and the like. The embodiments of the invention can also be practiced in distributed computing environments where tasks are performed by remote processing devices that are linked through a communications network, such as peer-to-peer network infrastructure.

FIG. 7 shows one example of a conventional computer system that can be used as encoder or a decoder. The computer system 1200 interfaces to external systems through the modem or network interface 1202. It will be appreciated that the modem or network interface 1202 can be considered to be part of the computer system 1200. This interface 1202 can be an analog modem, ISDN modem, cable modem, token ring interface, satellite transmission interface, or other interfaces for coupling a computer system to other computer systems. The computer system 1202 includes a processing unit 1204, which can be a conventional microprocessor such as an Intel Pentium microprocessor or Motorola Power PC microprocessor. Memory 1208 is coupled to the processor 1204 by a bus 1206. Memory 1208 can be dynamic random access memory (DRAM) and can also include static RAM (SRAM). The bus 1206 couples the processor 1204 to the memory 1208 and also to non-volatile storage 1214 and to display controller 1210 and to the input/output (I/O) controller 1216. The display controller 1210 controls in the conventional manner a display on a display device 1212 which can be a cathode ray tube (CRT) or liquid crystal display (LCD). The input/output devices 1218 can include a keyboard, disk drives, printers, a scanner, and other input and output devices, including a mouse or other pointing device. The display controller 1210 and the I/O controller 1216 can be implemented with conventional well known technology. A digital image input device 1220 can be a digital camera which is coupled to an I/O controller 1216 in order to allow images from the digital camera to be input into the computer system 1200. The non-volatile storage 1214 is often a magnetic hard disk, an optical disk, or another form of storage for large amounts of data. Some of this data is often written, by a direct memory access process, into memory 1208 during execution of software in the computer system 1200. One of skill in the art will immediately recognize that the terms "computer-readable medium" and "machine-readable medium" include any type of storage device that is accessible by the processor 1204 and also encompass a carrier wave that encodes a data signal.

Network computers are another type of computer system that can be used with the embodiments of the present invention. Network computers do not usually include a hard disk or other mass storage, and the executable programs are loaded from a network connection into the memory 1208 for execution by the processor 1204. A Web TV system, which is known in the art, is also considered to be a computer system according to the embodiments of the present invention, but it may lack some of the features shown in FIG. 7, such as certain input or output devices. A typical computer system will usually include at least a processor, memory, and a bus coupling the memory to the processor.

It will be appreciated that the computer system 1200 is one example of many possible computer systems, which have different architectures. For example, personal computers based on an Intel microprocessor often have multiple buses, one of which can be an input/output (I/O) bus for the peripherals and one that directly connects the processor 1204 and the memory 1208 (often referred to as a memory bus). The buses are connected together through bridge components that perform any necessary translation due to differing bus protocols.

It will also be appreciated that the computer system 1200 is controlled by operating system software, which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 1214 and causes the processor 1204 to execute the various acts required by the operating system to input and output data and to store data in memory, including storing files on the non-volatile storage 1214.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computerized method comprising:
   sorting, with a recommendation computer, attributes of multimedia objects into preference levels according to an ordering of the attributes, the ordering determined by analysis of past user activity;
   computing a weight for each preference level;
   computing an attribute weight for each of the attributes as a function of a corresponding preference level weight and a maximum possible number of values for a corresponding attribute, wherein the maximum possible number of values is a multiplicative factor in the computing of the attribute weight; and
   computing a similarity value between one of the multimedia objects and another multimedia object based on the attribute weights and a number of matches between the values of attributes common to the one of the multimedia objects and the another multimedia object.

2. The computerized method of claim 1, wherein the ordering represents a user's preference of multimedia object attributes.

3. The computerized method of claim 1, further comprising:
   ranking objects within the multimedia objects according to the computed similarity value of the multimedia objects to the object of interest.

4. The computerized method of claim 3, further comprising:
   outputting a sorted list of ranked multimedia objects.

5. The computerized method of claim 1, wherein the similarity value is further computed using the attribute weights of the attributes of the object to be ranked and a total number of values of the attributes of the object to be ranked.

6. A machine-readable storage medium having executable instructions to cause a processor to perform a method, the method comprising:
   sorting attributes of multimedia objects into preference levels according to an ordering of the attributes, the ordering determined by analysis of past user activity;
   computing a weight for each preference level;
   computing an attribute weight for each of the attributes as a function of a corresponding preference level weight and a maximum possible number of values for a corresponding attribute, wherein the maximum possible number of values is a multiplicative factor in the computing of the attribute weight; and
   computing a similarity value between one of the multimedia objects and another multimedia object based on the attribute weights and a number of matches between the values of attributes common to the one of the multimedia objects and the another multimedia object.

7. The machine-readable storage medium of claim 6, wherein the ordering represents a user's preference of multimedia object, attributes.

8. The machine-readable storage medium of claim 6, wherein the method further comprises:
   ranking objects within the multimedia objects according to the computed similarity value of the multimedia objects to the object of interest; and
   outputting a sorted list of ranked multimedia objects.

9. The machine-readable storage medium of claim 1, wherein the similarity value is further computed using the attribute weights of the attributes of the object to be ranked and a total number of values of the attributes of the object to be ranked.

10. A computer system comprising:
    a processor coupled to a memory through a bus; and
    a process executed from the memory by the processor to cause the processor to
       sort attributes of multimedia objects into preference levels according to an ordering of the attributes, the ordering determined by analysis of past user activity,
       compute a weight for each preference level,
       compute an attribute weight for each of the attributes as a function of a corresponding preference level weight and a maximum possible number of values for a corresponding attribute, wherein the maximum possible number of values is a multiplicative factor in the computing of the attribute weight, and
       compute a similarity value between one of the multimedia objects and another multimedia object of interest based on the attribute weights and a number of matches between the values of attributes common to the one of the multimedia objects and the another multimedia object.

11. The computer system of claim 10, wherein the ordering represents a user's preference of multimedia object attributes.

12. The computer system of claim 10, wherein the process further causes the processor to:
    rank objects within the multimedia objects according to the computed similarity value of the multimedia objects to the object of interest; and
    output a sorted list of ranked multimedia objects.

13. The computer system of claim 10, wherein the similarity value is further computed using the attribute weights of the attributes of the object to be ranked and a total number of values of the attributes of the object to be ranked.

14. An apparatus comprising:
    means for sorting attributes of multimedia objects into preference levels according to an ordering of the attributes, the ordering determined by analysis of past user activity;
    means for computing a weight for each preference level;
    means for computing an attribute weight for each of the attributes as a function of a corresponding preference level weight and a maximum possible number of values for a corresponding attribute, wherein the maximum possible number of values is a multiplicative factor in the computing of the attribute weight; and
    means for computing a similarity value between one of the multimedia objects and another multimedia object of interest based on the attribute weights and a number of matches between the values of attributes common to the one of the multimedia objects and the another multimedia object.

15. The apparatus of claim 14, further comprising:
    means for ranking objects within the multimedia objects according to the computed similarity value of the multimedia objects to the object of interest; and
    means for outputting a sorted list of ranked multimedia objects.

16. The apparatus of claim 14, wherein the ordering represents a user's preference of multimedia object attributes.

* * * * *